United States Patent Office 3,849,354
Patented Nov. 19, 1974

3,849,354
CABLE SEALANT COMPOSITION AND METHOD
OF SEALING CABLE
Larry A. Strecker and James E. Wood, St. Louis, Mo.,
assignors to Inmont Corporation, New York, N.Y.
Filed Feb. 22, 1972, Ser. No. 227,956
Int. Cl. C08f 45/52
U.S. Cl. 260—28.5 B 2 Claims

ABSTRACT OF THE DISCLOSURE

A cable sealant to seal the voids between the strands of electrical and similar cables to prevent water flow through same and to seal the cable elements from the atmosphere. The preferred cable sealant composition comprises about 10% by weight ethylene propylene rubber copolymer, about 40% discrete particles of butadiene-acrylonitrile rubber copolymer, about 15% polypropylene, about 11% polyethylene, about 10% paraffin wax and about 13% liquid paraffinic hydrocarbons. About 1% of colorant such as iron oxide is normally added to this composition, which is blended to form the cable sealant.

A method of sealing cable by filling the voids between cable strands with the above composition at a temperature preferably in the range between 225° and 275° F.

BACKGROUND OF THE INVENTION

Field of the Invention

This invention pertains to sealant compositions for cable such as electrical cable. Among other uses, such sealants are employed in cable used in ships in order to prevent water flow between supposedly water tight compartments through the voids in electrical and similar cable. Such cable sealants also provide increased cable life due to isolation of the cable strands from the atmosphere.

Description of the Prior Art

Cable sealants are, of course, known in the art. However, such sealants have normally employed semi-drying polyesters or vegetable oil derived materials filled with inert fillers. Such cable sealants harden after a few years to such an extent that the sealant will fracture if the cable is flexed, causing in turn seal failure and probable malfunction.

Other known cable sealants have used polybutene polymers to avoid the above problems. However, the polybutene polymers have been found to attack common cable components such as polyethylene.

Another disadvantage of existing cable sealants is that they tend to adhere to deck and other areas when pieces of the sealant are removed from cable and discarded during splicing operations. Due to the danger of fire and toxic gases in the confined spaces aboard ship, removal of these splicing scraps from deck areas has required use of non-toxic and non-flammable solvents such as Freons. Such solvents are, of course, quite expensive.

Recent improvements in cable sealants and their method of use are disclosed in copending, commonly assigned U.S. application Ser. No. 11,605, filed Feb. 16, 1970, by J. E. Wood, L. A. Strecker, and Robert E. Cratz and entitled "Cable Sealant Composition and Method of Sealing Cable." The disclosure of that application is incorporated herein by reference. However, applicants have now discovered still better compositions and method of sealing cable, disclosed herein.

SUMMARY OF THE INVENTION

Applicants have now developed a novel cable sealant composition which preferably comprises a blend of ethylene propylene rubber copolymer, discrete particles of butadiene acrylonitrile copolymer, polypropylene, polyethylene, paraffinic hydrocarbons and colorant.

This invention involves a unique composition that has many of the properties of a high molecular weight rubber elastomer such as resilience, low temperature flexibility, temperature resistance and inertness. Examples of high molecular weight elastomers are cured silicone, neoprene and butyl rubbers. These rubbers themselves cannot be used because they do not lend themselves to deposit by pumping. By contrast, the compositions of this invention can be deposited by pumping. Also, because the butadiene-acrylonitrile copolymer is dispersed as discrete particles in the somewhat wax-like relatively low molecular weight hydrocarbon blend comprising the rest of the sealant, the sealant has very low cohesive strength which allows for easy removal from a cable. The butadiene-acrylonitrile copolymer is a relatively polar polymer which is sufficiently incompatible or non-miscible so that it stays as discrete particles in the continuous wax-like phase comprising the remainder of the sealant.

Also, this composition has been found to retain its elastomeric properties over a long period of time, thus extending cable life to periods such as twelve years, almost triple that of currently employed cables.

Furthermore, the cable sealant of this invention clings to the interior portions of cable cover and to the exterior of the strands of the cable but has been found not to adversely affect the cable components. For example, it does not craze, crack, solvate or swell such common cable components as polyethylene, vinyl materials such as polyvinyl chloride, impregnated fabrics, silicones, and nylon or Mylar films.

Finally, when stripped from the cable during splicing operations, the cable sealant of this invention strips easily and quickly. Also when pieces of cable sealant are discarded on deck and other surfaces, they do not adhere to such surfaces and are readily swept up, since this sealant composition has no adhesion to other materials unless applied to them while heated.

BRIEF DESCRIPTION OF THE DRAWING

Referring more particularly to the drawings, FIG. 1 shows in cross-section a conventional cable consisting of a cable cover 1, cable strands 2, and voids 3 between the strands. The strands 2 normally consist of a protective covering 4 surrounding a current-carrying wire 5.

Figure 1:
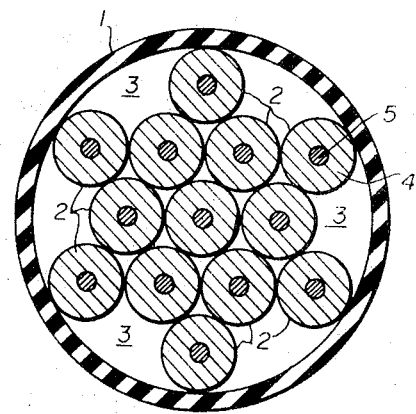
FIG. 1 is a cross-sectional view of a conventional electrical cable showing the cable cover, cable strands and voids between the strands.
Figure 2:
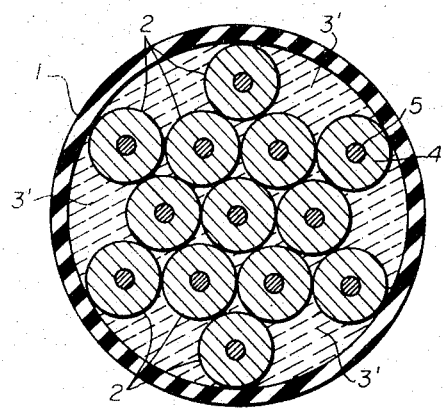
FIG. 2 is a cross-sectional view of a cable utilizing the cable sealant of this invention to effectively seal the voids between the cable strands.

Referring more particularly to FIG. 2, this figure differs from FIG. 1 in that the void areas 3 have been filled with the cable sealant composition 3' of this invention, thus effectively sealing the interior of the cable, rendering it water tight and also protecting the cable strands from the effects of atmospheric penetration.

DESCRIPTION OF THE PREFERRED EMBODIMENT

A typical formulation for the sealant composition of this invention is as follows (all parts being by weight):

| | Percent |
|---|---|
| Butadiene-acrylonitrile copolymer (discrete particles) | 40 |
| Ethylene propylene copolymer | 10 |
| Polypropylene (atactic) | 15 |
| Polyethylene | 11 |
| Paraffin wax | 10 |
| Paraffinic hydrocarbons (liquid) | 13 |
| Iron oxide | 1 |
| | 100 |

The ethylene propylene copolymer used in this invention is a rubbery material generally known as EPR or ethylene propylene rubber. The preferred material has an average molecular weight of about 260,000, contains about 50 mol percent polypropylene, has a Mooney viscosity (ASTM D1646) of about 40 and a specific gravity of about 0.86. Other olefinic elastomers such as butyl rubber, natural rubber, chloroprene, chlorosulfonated polyethylene, EPDM, or combinations of these with ethylene propylene copolymers are also suitable provided that such materials have a molecular weight within the range from about 50,000 to about 900,000. When ethylene-propylene rubber is used, the propylene content can range from about 30–90 mol percent.

The butadiene-acrylonitrile copolymer used in this composition is a finely divided powder up to about 1 mm. in diameter which is insoluble in the remainder of the composition and is generally known as high acrylonitrile polymer. It has a molecular weight range of 300,000 to 1,000,000 and particularly about 500,000, an acrylonitrile content of about 40%, has a Mooney viscosity (ASTM D1646) of about 115 and a specific gravity of about 1.0, Other butadiene-acrylonitrile copolymers of very high acrylonitrile content or of medium acrylonitrile content may also be used as well as butadiene-acrylonitrile vinyl chloride blends, butadene-styrene copolymers and isoprene-styrene copolymers or combinations of these provided that such materials have a molecular weight range within 300,000 to 1,000,000.

Polypropylenes suitable for use in this invention are atactic, have a specific gravity in the range from about 0.87 to 0.93, a melt point from about 100–250° C., preferably from about 150–175° C., and particularly about 167° C., and an average molecular weight in the range from about 10,000 to about 600,000, preferably from about 20,000 to about 30,000 and particularly about 25,-000. Polypropylene blended with elastomers such as polychloroprene, SBR (styrene butadiene rubber), EPDM (ethylene propylene diene monomer), propylene alloys, and other olefin polymers such as polyisobutylene and poly 4-methyl pentene is also suitable if the physical properties and molecular weight are within the above ranges.

Polyethylenes having a melt index within the range from about 8 to about 100, preferably from about 15–25, and particularly about 22 are suitable for use with this invention. The polyethylene can, if desired, be in the form of a copolymer with other materials such as ethylene vinyl acetate, ethylene ethyl acrylate, ethyl methacrylate, crosslinked polyethylene and chlorinated polyethylene as long as the copolymer is within the above melt index range. Polyethylenes for use in this invention have a specific gravity in the range from about 0.91–0.94, particularly about 0.92, crystallinity in the range from about 50% to 70%, particularly about 50%, and contain from about 3 to about 50 methyl groups per 100 carbon atoms.

Petroleum crystalline (not microcrystalline) paraffin wax having a melting point in the range of 100° F. to 200° F., preferably 150° to 170° F., a specific gravity of 0.80 to 1.0, preferably about 0.95 and a penetration (ASTM D1321 mm./10 at 77° F.) of 10 to 25, preferably 13, is suitable for use with this invention.

Paraffinic hydrocarbons suitable for use with this invention are liquids having an aniline point above about 190° F., a Saybolt Universal viscosity of at least about 40 seconds and a specific gravity from about 0.86 to about 0.93, particularly about 0.89. These materials are employed primarily as plasticizers. Other suitable plasticizers which can be used are propene esters such as propylene carbonate, dibasic acid esters such as dioctyl adipate, diisooctyl phthalate or diisodecyl adipate, drying oil esters such as Rohm and Haas 210H (esterified residue from sebacic acid), and polyethers such as Pluracol, a hydroxyl terminated polyether marketed by Wyandotte Chemicals Co., having the above physical properties.

It is often desirable, but not essential, to employ a colorant in the blend of this composition. One example of such a colorant is iron oxide ($Fe_2O_3$). Other pigments may of course also be used as long as they do not interfere with the properties of the blend. Also, it may under some circumstances be desirable to add inert fillers to the composition.

The above-described components can vary as to their approximate weight percent in the overall composition as follows:

|  | Broad range, percent | Preferred range, percent |
| --- | --- | --- |
| Ethylene propylene rubber | 5–25 | 8–15 |
| Butadiene-acrylonitrile copolymer | 20–50 | 30–40 |
| Atactic polypropylene | 10–30 | 10–15 |
| Polyethylene | 5–30 | 10–20 |
| High melting point paraffin wax | 1–20 | 5–15 |
| Paraffinic oil | 10–30 | 10–15 |
| Colorant | 0–10 | 0.1–1 |

An example of a preferred sealant composition is set forth below.

EXAMPLE

| | Percent |
| --- | --- |
| Ethylene propylene rubber (40 Mooney viscosity: 0.86 specific gravity) | 10 |
| Butadiene-acrylonitrile copolymer (115 Mooney viscosity: 500,000 molecular weight, 1.0 specific gravity) | 40 |
| Atactic polypropylene (120° C. softening point; 9,000 centipoise viscosity at 90° C.: 0.81 specific gravity) | 15 |
| Polyethylene (22 melt index; 0.92 specific gravity) | 11 |
| Petroleum paraffin wax, 160° F. melting point, 13 mm./10 penetration | 10 |
| Paraffinic oil (aniline point 240° F.: viscosity at 210° F., 110 seconds Universal Saybolt) | 13 |
| Iron oxide | 1 |
| | 100 |

The blend was mixed in a clean kneading-type semi-intensive Baker-Perkins mixer jacketed for heating and cooling. (Either a dispersion type or sigma type blade can be used.) With pipe tempearture cooling water on, the ethylene propylene rubber was added to the mixer and mixed for a short time. Then while still mixing, atactic polypropylene was added, followed by polyethylene and iron oxide. The paraffin wax and paraffinic oil were then blended into the mixture. At the beginning of addition of the polyethylene, the water in the mixer jacket was replaced by steam sufficient to achieve a mixing temperature between about 240° and 260° F.

The sealant described in the above example and the other sealants within the scope of this invention can be handled within a range of temperature from about 170° to about 350° F., preferably about 225–275° F. and particularly about 250° F. When applied to other materials at such temperatures adherence will result. Of course, the temperature of application should not exceed a temperature which would damage any of the cable components. There is substantially no shrinkage of the sealant upon cooling. The viscosity of sealants within the scope of this invention, as measured by Brabender plastograph, is in the range from about 200 to about 300 meter-grams at 250° F.

These novel compositions possess many of the characteristics normally associated with cured elastomers such as polysulfides and SBR but are capable of being deposited in a plastic state under the influence of heat and pressure into the interstices of cable.

The sealants of this invention are of unusually low specific gravity, i.e. from about 0.8–1.35, preferably 0.82–0.93 and particularly about 0.88.

Although this invention is particularly useful as a sealant for electrical cable, its use is, of course, not limited to this particular application. Many other applications will be apparent to those skilled in the plastic and sealant arts.

APPENDIX

Set forth below are commercial materials which were used in the example. Of course, numerous other materials having properties within the ranges previously specified can also be used.

| | |
|---|---|
| Ethylene propylene rubber | Vistalon 404 — Enjoy Chemical Co. |
| Butadiene-acrylonitrile copolymer | Hycar 1411, B. F. Goodrich Chem. Co. |
| Polyethylene | Petrothene Grade 208, U.S. Industrial Chem. Co. |
| Polypropylene | Propene C-95, Chemfax Corp. |
| Paraffinic oil | Shellflex 740, Shell Chemical Co. |
| Paraffin wax | Shellwax 300, Shell Chemical Co. |
| Iron oxide | Chroma Red RO-8097, C. K. Williams Co., East St. Louis, Ill. |

We claim:

1. A composition of matter comprising a normally noncuring blend of from about:
   (a) 5–25% by weight ethylene propylene rubber,
   (b) 20–50% by weight of butadiene-acrylonitrile copolymer,
   (c) 10–30% atactic polypropylene,
   (d) 5–30% polyethylene,
   (e) 1–20% of paraffin wax, and
   (f) 10–30% liquid paraffinic hydrocarbons.

2. The composition of claim 1, wherein the composition contains from about:
   (a) 8–15% ethylene propylene rubber,
   (b) 30–40% butadiene-acrylonitrile copolymer, and said discrete particles are less than about 1 mm. in diameter,
   (c) 10–15% atactic polypropylene,
   (d) 10–20% polyethylene,
   (e) 5–15% paraffin wax, and
   (f) 10–15% paraffinic oil.

References Cited
UNITED STATES PATENTS

| | | | |
|---|---|---|---|
| 3,536,653 | 10/1970 | Bickel et al. | 260—28.5 A |
| 3,492,372 | 1/1970 | Flanagan | 260—28.5 A |
| 3,220,966 | 11/1965 | Flanagan | 260—28.5 A |
| 3,262,977 | 7/1966 | Edwards et al. | 260—28.5 A |
| 3,352,944 | 11/1967 | Wheat | 260—28.5 B |
| 3,412,058 | 11/1968 | Boyer | 260—889 |
| 3,526,606 | 9/1970 | Minekawa | 260—889 |

MORRIS LIEBMAN, Primary Examiner

P. R. MICHL, Assistant Examiner

U.S. Cl. X.R.

156—48; 260—5, 28.5 D, 31.8 DR, 33.6 AQ, 889